No. 744,752. PATENTED NOV. 24, 1903.
J. B. HADAWAY.
WELTING FOR WELT SHOES.
APPLICATION FILED MAY 29, 1902.
NO MODEL.
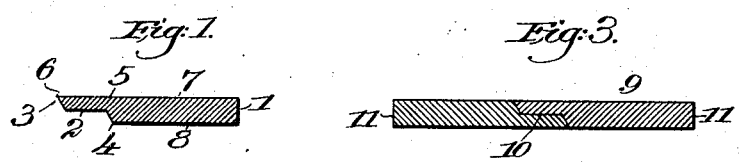
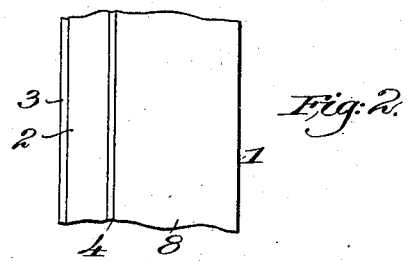
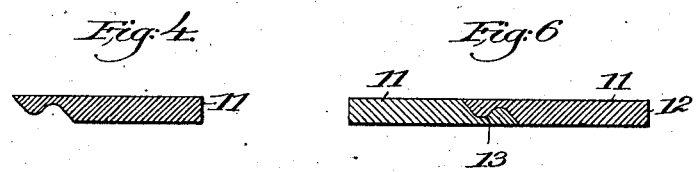
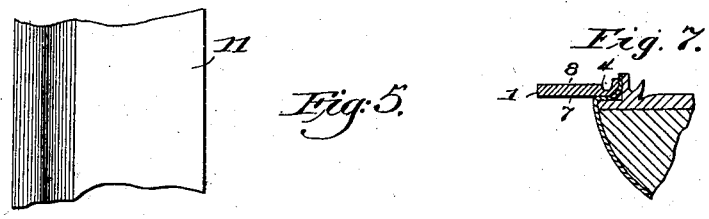
Witnesses:
John F. C. Prinslock
Alfred H. Hildreth.
Inventor:
John B. Hadaway
by his Attorneys
Phillips Van Coeren & Fish No. 744,752.

Patented November 24, 1903.

UNITED STATES PATENT OFFICE.

JOHN B. HADAWAY, OF BROCKTON, MASSACHUSETTS.

WELTING FOR WELT-SHOES.

SPECIFICATION forming part of Letters Patent No. 744,752, dated November 24, 1903.

Application filed May 29, 1902. Serial No. 109,506. (No model.)

*To all whom it may concern:*

Be it known that I, JOHN B. HADAWAY, a citizen of the United States, residing at Brockton, in the county of Plymouth and State of Massachusetts, have invented certain new and useful Improvements in Welting for Welt-Shoes; and I do hereby declare the following to be a full, clear, and exact description of the invention, such as will enable others skilled in the art to which it appertains to make and use the same.

The present invention relates to an improvement in welting for use in the manufacture of welt-shoes.

Heretofore it has been the practice in the manufacture of welting for use in the manufacture of welt-shoes to form a groove in the under side of the strip extending approximately half through such strip, which groove receives the inseam-stitches for uniting the welt to the upper and insole. The upper inner edge of the welt is also usually beveled or skived. According to my invention I form a strip of welting, which is cut away on its under side from its inner edge to slightly beyond the inseam-stitch-receiving portion—that is, the portion of the welt through which the inseam-stitches pass. By so forming a strip of welting I am enabled to cut two welts from a single strip of material of less width than the combined width of the two welts, and thereby accomplish a substantial saving in the amount of material used in making the welts, for every two welts made a strip of material being saved equal in width to the cut-away portion of a welt. The welt so formed is equal in strength and durability to the old form of welt, although that portion of the welt which comes within the inseam is reduced in thickness, as the excess of material in the old form of welt is cut away during the inseam-trimming operation, or if allowed to remain adds nothing to the strength of the welt.

By cutting away the welt from its inner edge to a point beyond the inseam-stitch-receiving portion I reduce the thickness of that portion of the welt which is turned up during the inseam-sewing operation, thereby rendering it more flexible and easier of application to the shoe.

Another advantage secured by my improved welt is that when the reduced portion is turned up a welt is produced having a beveled upper inner edge without cutting away a portion of the upper surface of the welt. The upper surface of the welt is thus smooth and regular throughout, and there is no danger of leaving an unfinished portion of the welt exposed in sewing the welt to the shoe, as often happens in sewing a welt in which the bevel at the upper inner edge is formed by cutting away a portion of the upper surface of the welt.

The broken line upon which the welt is cut away on its lower side may be made up of either curved or straight lines or a combination of curved and straight lines. Preferably the line of cut will be such as to form a beveled shoulder beyond the inseam-stitch-receiving portion, as thereby clearance is afforded for the needle.

Other advantageous features of my invention will be obvious to those skilled in the art from the following description.

In the accompanying drawings, illustrating my invention, Figure 1 is a cross-section, and Fig. 2 is an under side plan, of the preferred form of my invention. Fig. 3 is a cross-section of a strip of welt material, illustrating how it is cut to produce the form of welting illustrated in Figs. 1 and 2. Fig. 4 is a cross-section, and Fig. 5 an under side plan, of a modified form of my invention. Fig. 6 is a section of a strip of welt material showing the line of cut to produce the welting shown in Figs. 4 and 5. Fig. 7 is a fragmentary sectional view showing the relative positions of the insole, upper, and form of welt illustrated in Fig. 1 in position to be united by the inseam.

The strip of welt material 1 is cut away at 2 on its under side from its inner edge 3 to a point 4 slightly beyond the inseam-stitch-receiving portion 5, the cut being along a broken line made up of two intersecting straight lines. The inner edge of the strip is beveled or inclined, as at 6, from its upper side 7 toward the under side 8. This form of welt is preferably produced from a strip of welt material 9 by cutting it upon the broken line 10, which extends from a point on one side of the material diagonally into the material for a distance equal to about one-half the thickness of the strip, thence parallel with the sides of the strip for a short distance, and thence diagonally onward to the opposite side of the material. The two portions 11 thus formed from the strip 9 are alike in form; but in one of them the grain of the leather will appear upon the upper side of the welt, while on the other the grain of the leather will appear upon the under side of the strip. In the latter case the upper side of the strip will have to be finished in any suitable way, as by coloring or otherwise finishing the same.

By cutting the strip of welt material 1 along the broken line 10 it will be seen that two welts are produced, each of which is greater in width than half the width of the strip 1, and that for every two welts produced a strip of leather is saved equal in width to those portions of the welts which are reduced in thickness and which overlap in the strip. That portion of the welt which is reduced in thickness is easily bent up in the position which it occupies in the completed shoe, as indicated in Fig. 7, and when so bent up a beveled inner upper edge is formed on the welt, as is also clearly shown in said figure. The beveled upper inner edge of the welt is thus produced without cutting away the upper surface of the welt, so that the upper surface of the welt is smooth and regular throughout, and no unfinished portion of the welt can be exposed after the welt is secured in position. The form of the cut by which the strip 1 is divided is such that the shoulder of each welt-strip beyond the inseam-stitch-receiving portion is beveled, so as to afford clearance for the needle.

In Figs. 4 and 5 I have shown a modified form of my invention in which the strips 11 are formed by cutting the strip of welt material 12 upon a broken line 13, made up of a number of intersecting or tangential curved lines, said broken line extending from surface to surface of the strip 12, as shown in Fig. 6, whereby two pieces of welting are produced which are alike in form, but in which the reduced portion of each welt has its under side curved instead of angular.

My invention is not limited to the illustrated embodiments thereof, but contemplates other forms of welting embodying the essential features defined in the claims.

Having thus described my invention, I claim—

1. As an article of manufacture, a strip of welting for use in the manufacture of welt-shoes consisting of a strip of welt material cut away on its under side on a broken line from its inner edge to a point beyond the inseam-stitch-receiving portion, substantially as described.

2. As an article of manufacture, a strip of welting for use in the manufacture of welt-shoes consisting of a strip of welt material cut away on its under side on a broken line from its inner edge to beyond the inseam-stitch-receiving portion, and having a beveled shoulder beyond the inseam-stitch-receiving portion, substantially as described.

3. As an article of manufacture, a strip of welting for use in the manufacture of welt-shoes consisting of a strip of welt material cut away from its inner upper edge diagonally downward through about half the thickness of the welt, thence substantially parallel with the sides of the welt to a point beyond the inseam-stitch-receiving portion of the welt and thence downward through the remainder of the thickness of the welt, substantially as described.

In testimony whereof I affix my signature in presence of two witnesses.

JOHN B. HADAWAY.

Witnesses:
 FRED O. FISH,
 ALFRED H. HILDRETH.